United States Patent
Zhu et al.

(10) Patent No.: US 9,430,069 B2
(45) Date of Patent: Aug. 30, 2016

(54) TOUCH SCANNING METHOD FOR TOUCH SCREEN, TOUCH SCANNING CONTROL CIRCUIT AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Zhifeng Zhu, Shanghai (CN); Xupeng Wang, Shanghai (CN); Baolei Guo, Shanghai (CN); Shanrong Wang, Shanghai (CN); Xiaoyuan Ding, Shanghai (CN)

(73) Assignees: Shanghai AVIC OPTO Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/217,144

(22) Filed: Mar. 17, 2014

(65) Prior Publication Data

US 2015/0109217 A1  Apr. 23, 2015

(30) Foreign Application Priority Data

Oct. 21, 2013 (CN) .......................... 2013 1 0493523

(51) Int. Cl.
| | |
|---|---|
| *G06F 3/041* | (2006.01) |
| *G06F 1/32* | (2006.01) |
| *G06F 3/047* | (2006.01) |
| *G06F 3/044* | (2006.01) |

(52) U.S. Cl.
CPC ............. *G06F 3/041* (2013.01); *G06F 1/3262* (2013.01); *G06F 3/0416* (2013.01); *G06F 3/044* (2013.01); *G06F 3/047* (2013.01)

(58) Field of Classification Search
CPC ...... G06F 3/041; G06F 3/0412; G06F 3/044; G06F 3/045; G06F 3/047; G06F 3/0416
USPC ........ 345/173–175; 178/18.01, 18.03, 18.05, 178/18.06
See application file for complete search history.

(56) References Cited

U.S. PATENT DOCUMENTS

| | | | | |
|---|---|---|---|---|
| 5,691,513 | A * | 11/1997 | Yamamoto | G06F 3/046 178/18.07 |
| 5,844,506 | A * | 12/1998 | Binstead | 341/34 |
| 8,217,914 | B2 * | 7/2012 | Koshiyama et al. | 345/173 |
| 9,069,425 | B2 * | 6/2015 | Shin | G06F 3/044 |

(Continued)

FOREIGN PATENT DOCUMENTS

| | | |
|---|---|---|
| CN | 103135816 A | 6/2013 |
| CN | 103257740 A | 8/2013 |

*Primary Examiner* — Jason Mandeville
(74) *Attorney, Agent, or Firm* — Alston & Bird LLP

(57) ABSTRACT

A touch scanning method includes, in the absence of a touch, performing a coarse scanning on the touch screen, and in the presence of a touch, performing a fine scanning on a full detection-activated region containing a touch point while performing the coarse scanning on the remaining region other than the full detection-activated region. During coarse scanning, in first M frames of M+N successive frames, drive lines spaced apart from one another by at least one of the drive lines are driven, and sense lines spaced apart from one another by at least one of the sense lines are detected. In the succeeding N frames of the M+N frames, there is no activity in the drive and sense lines. During the fine scanning, each drive line and each sense line within the full detection-activated region is driven and detected, respectively.

13 Claims, 7 Drawing Sheets

(56) References Cited

U.S. PATENT DOCUMENTS

| | | | |
|---|---|---|---|
| 2008/0309631 A1* | 12/2008 | Westerman et al. | 345/173 |
| 2009/0066665 A1* | 3/2009 | Lee | 345/173 |
| 2009/0207154 A1* | 8/2009 | Chino | G06F 3/0416 345/175 |
| 2010/0265199 A1* | 10/2010 | Chen | G06F 1/3203 345/173 |
| 2010/0309171 A1* | 12/2010 | Hsieh | G06F 3/0416 345/204 |
| 2012/0050216 A1* | 3/2012 | Kremin et al. | 345/174 |
| 2012/0062482 A1* | 3/2012 | Ding | G06F 1/3215 345/173 |
| 2012/0154324 A1* | 6/2012 | Wright et al. | 345/174 |
| 2012/0162134 A1* | 6/2012 | Chen | G09G 3/3648 345/174 |
| 2013/0050116 A1* | 2/2013 | Shin | G06F 3/044 345/173 |
| 2013/0215049 A1* | 8/2013 | Lee | 345/173 |
| 2015/0002451 A1* | 1/2015 | Um | G06F 3/044 345/174 |

* cited by examiner

TOUCH SCANNING METHOD FOR TOUCH SCREEN, TOUCH SCANNING CONTROL CIRCUIT AND DISPLAY DEVICE

CROSS-REFERENCES TO RELATED APPLICATIONS

This application claims the benefit of priority to Chinese Patent Application No. 201310493523.X, filed with the Chinese Patent Office on Oct. 21, 2013 and entitled "TOUCH SCANNING METHOD FOR TOUCH SCREEN, TOUCH SCANNING CONTROL CIRCUIT AND DISPLAY DEVICE", the content of which is incorporated herein by reference in its entirety.

TECHNICAL FIELD OF THE INVENTION

The present invention relates to the field of touch screens, and more particularly to a method for scanning a touch screen, a touch scanning control circuit for a touch screen, and a display device including a touch screen.

BACKGROUND OF THE INVENTION

Touch screens have increasingly replaced the traditional keyboards, and the development of touch detection technologies have become relatively more mature. In existing designs with respect to touch detection of a capacitive touch screen, a scanning control unit of the capacitive touch screen controls each of drive lines Tx to sequentially send a driving signal along the scanning direction shown in FIG. 1A, and controls each of sense lines Ry to receive the signal synchronously, so that the position of a touch point is detected by comparing the capacitance before the touch with that after the touch, to obtain coordinates of the touch point. To prevent mal-operation and improve the detection accuracy of a touch point, generally pattern designs ensure that no less than 4 coordinate points would be touched by a finger every time, as shown in FIG. 1B, and then the relatively precise coordinates of the touch point are obtained by calculating the center or the gravity center of the no less than 4 coordinate points.

However, for a precise positioning, each of the drive lines Tx is scanned from the first drive line to the last drive line within each frame, to detect as many touch points as possible. However, such row-by-row scanning technique not only consumes more power, but also requires a large number of lines Tx and sense lines Ry that may exceed the capability of an integrated circuit for driving a large-sized screen. Further, in order to achieve a balance between driving capability and driving signal quality, the number of the drive lines Tx and the sense lines Ry is generally reduced. The reduced number of drive and sense lines, however, results in a reduced detection accuracy of a touch panel.

BRIEF SUMMARY OF THE INVENTION

Some embodiments of the present invention relate to a touch scanning method for a touch screen, a touch scan control circuit and a display device.

Specifically, embodiments of the present invention provide a touch scanning method for a touch screen, the touch screen includes a number of drive lines and a number sense lines arranged in a matrix. The method includes: if a touch is absent, performing a coarse scanning on the entire touch screen, and if a touch is present, performing a fine scanning on a full detection-activated region containing a touch point while performing the coarse scanning on the remaining region other than the full detection-activated region. During the coarse scanning, in first M frames of M+N successive frames, the coarse scanning may include driving the drive lines that are spaced apart from one another by at least one of the drive lines, and detecting sense lines that are spaced apart from one another by at least one of the sense lines; while in succeeding N frames of the M+N successive frames, driving the drive lines and detecting the sense lines are stopped. During the fine scanning, in the M+N successive frames, the method includes driving each of drive lines within the full detection-activated region and detecting each of sense lines within the full detection-activated region. Both M and N are integers equal to or greater than 1.

Embodiments of the invention also provide a touch scanning control circuit which is connected with a touch screen, and the touch scanning control circuit includes: a data acquisition control module, a position calculation and determination module, a calculation module, and a control module. The data acquisition control module is configured to acquire data in the presence of a touch and send the acquired data to the position calculation and determination module; the position calculation and determination module is configured to calculate a touch position based on the acquired data, determine a center position nearest to the touch position, and send the center position to the calculation module; the calculation module is configured to define a full detection-activated region; and the control module is configured to perform a fine scanning on the full detection-activated region, and perform a coarse scanning on the remaining region other than the full detection-activated region. During the coarse scanning, in first M frames from M+N successive frames, drive lines spaced apart from one another by at least one of the drive lines are driven, and sense lines spaced apart from one another by at least one of the sense lines are detected; while in succeeding N frames of the M+N successive frames, driving the drive lines and detecting the sense lines are stopped. During the fine scanning, in the M+N successive frames, each of drive lines within the full detection-activated region is driven and each of sense lines within the full detection-activated region is detected. Both M and N are integers equal to or greater than 1.

Embodiments of the invention also provide a display device including a touch screen and any one of above touch scanning control circuits, where the touch scanning control circuit is electrically connected with the touch screen.

The following description, together with the accompanying drawings, will provide a better understanding of the nature and advantages of the claimed invention.

DETAILED DESCRIPTION OF THE INVENTION

Various embodiments are described herein by way of example, and features described with respect to different embodiments may be combined and interchanged, without departing from the scope or spirit of the present invention.

[An Embodiment]

Figure 1A:
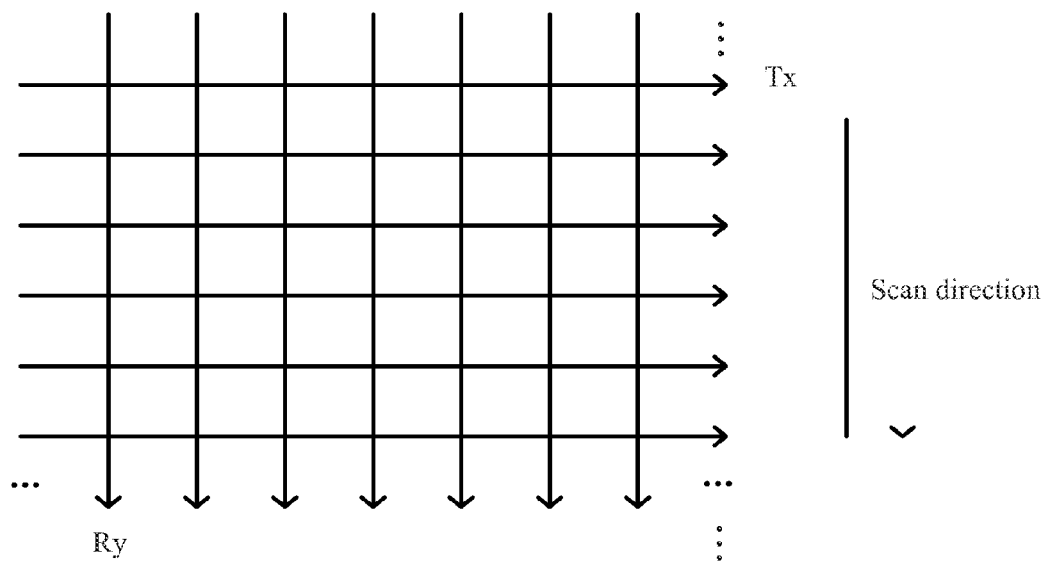
FIGS. 1A and 1B are schematic diagrams showing the conventional touch detection technology of a capacitive touch screen.
Figure 1B:
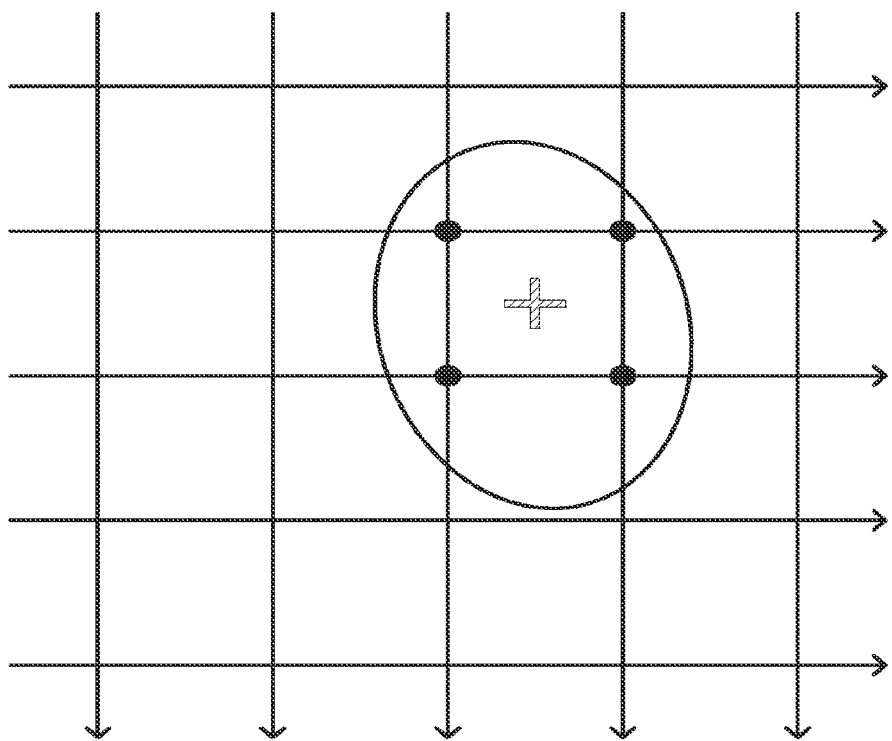
Figure 2A:
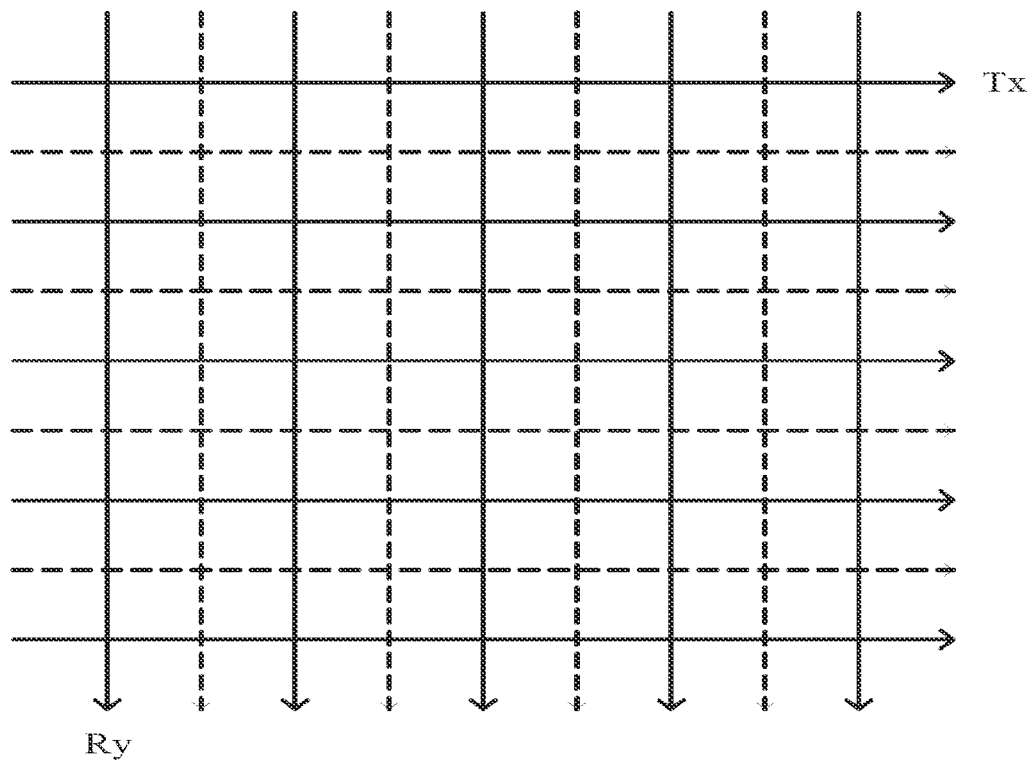
FIGS. 2A to 2D are simplified schematic diagrams of a scanning method according to an embodiment of the present invention.

The present embodiment provides a touch scanning method for a touch screen. The touch screen includes a number of drive lines Tx and a number of sense lines Ry. FIG. 2A shows an exemplary matrix arrangement of drive lines and sense lines. The touch scanning method includes: if a touch is not present, performing a coarse scanning on the entire touch screen, specifically, in first M frames of M+N successive frames, drive lines spaced apart from one another by at least one of the drive lines, and sense lines spaced apart from one another by at least one of the sense lines are detected; while in succeeding N frames of the M+N successive frames, driving the drive lines and detecting the sense lines are stopped; and if a touch is present, performing a fine scanning on a full detection-activated region containing a touch point while performing the coarse scanning on the remaining region other than the full detection-activated region, where during the fine scanning, in the M+N successive frames, each of drive lines within the full detection-activated region is driven and each of sense lines within the full detection-activated region is detected. Both M and N are integers equal to or greater than 1. Driving of the drive lines and detection of the sense lines are periodically performed on the touch screen by a repeated scanning cycle formed by the M+N successive frames.

According to the touch scanning method of the present embodiment, power consumption of the touch screen can be saved in the absence of a touch. Further, in the presence of a touch, the touch screen is partitioned into a number of touch regions, so that the fine scanning is performed in the full detection-activated region containing the touch point, while the coarse scanning is performed in the remaining region with no touch point other than the full detection-activated region, that is, not all the drive lines in the entire touch screen are driven, and not all the sense lines in the entire touch screen are detected, thus the power consumption can also be saved even in the presence of a touch.

Figure 2B:
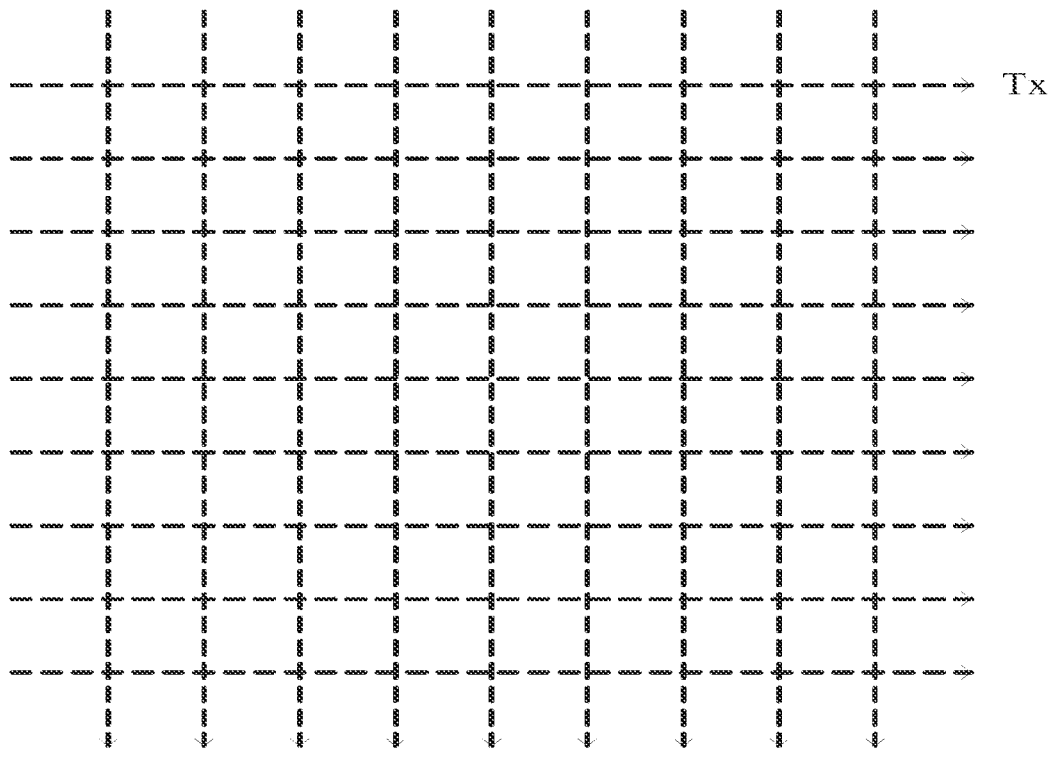

Specifically, in the absence of a touch on the touch screen, the coarse scanning is performed on the entire touch screen. In the first M frames of M+N successive frames (both M and N are integers equal to or greater than 1), drive lines Tx being spaced apart from one another by one of the drive lines are driven, and sense lines Ry being spaced apart from one another by one of the sense lines are detected, as shown in FIG. 2A; while in the succeeding N frames from the M+N successive frames, driving the drive lines and detecting the sense lines are stopped in the touch screen, as shown in FIG. 2B. More specifically, preferably in the first M frames from the M+N successive frames, the odd-numbered rows of the scan lines Tx are driven, and the odd-numbered columns of the sense lines Ry are detected to receive signals; while in the succeeding N frames of the M+N successive frames, driving the drive lines and detecting the sense lines are stopped on the touch screen. In the first M frames of another subsequent M+N successive frames, the even-numbered rows of the drive lines Tx are driven, and the even-numbered columns of the sense lines Ry are detected to receive signals, while in the succeeding N frames from the subsequent M+N successive frames, driving the drive lines and detecting the sense lines are stopped on the touch screen. As such, driving of the drive lines and detection of the sense lines are periodically performed.

Figure 2C:
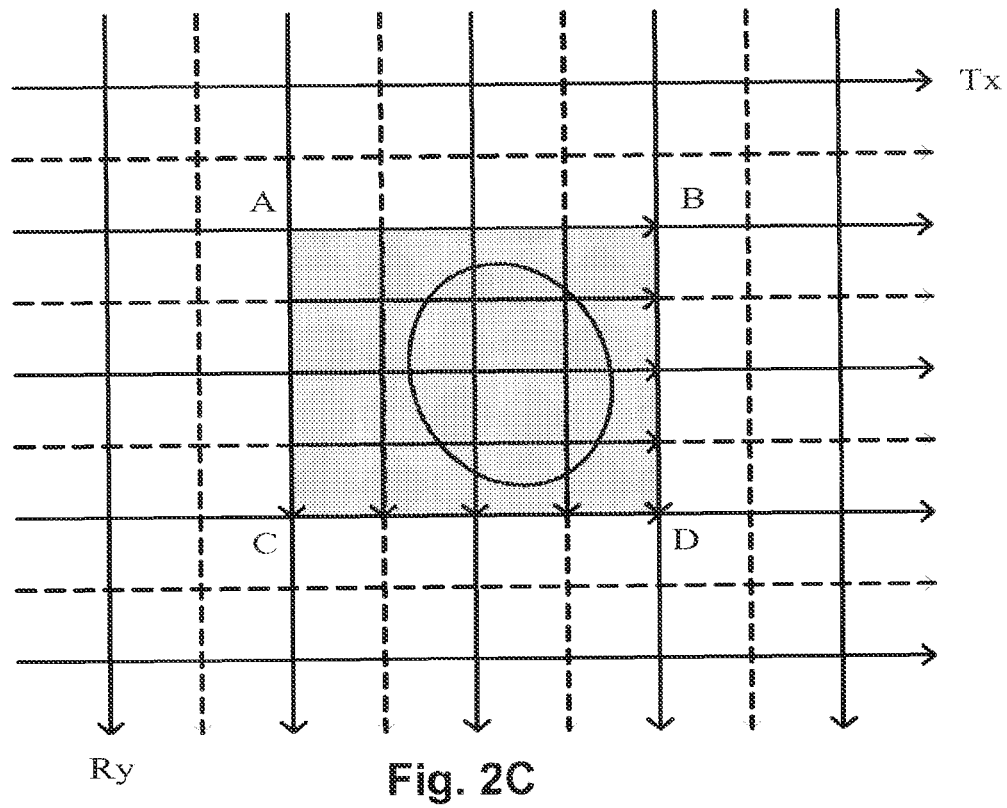
Figure 2D:
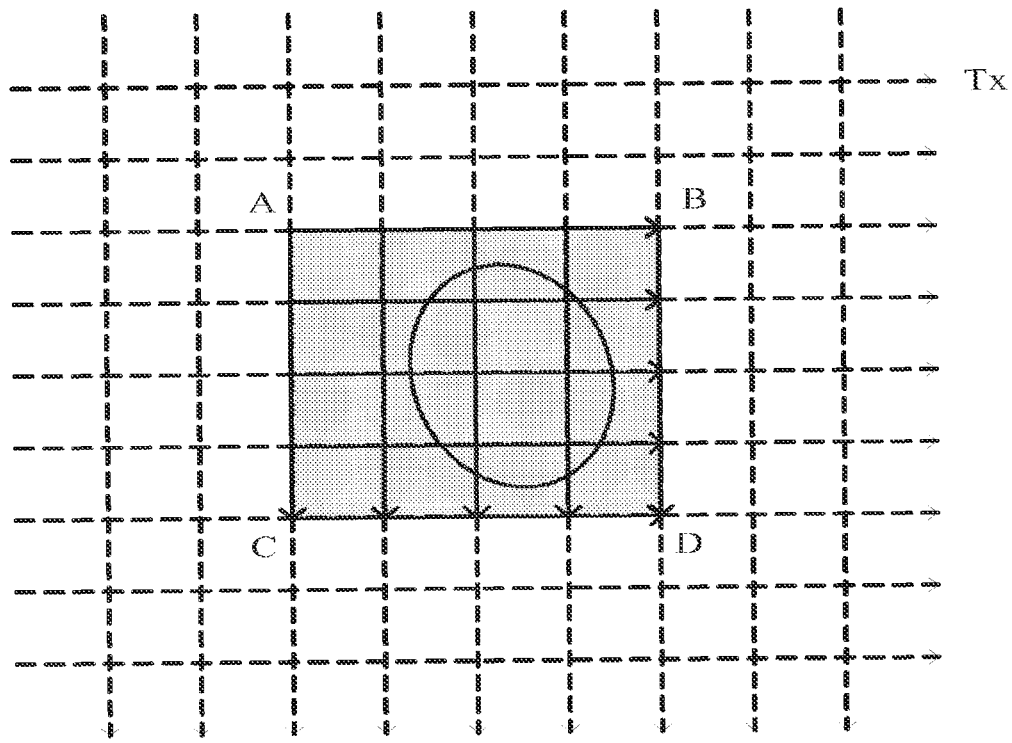

When the touch screen is being touched, the fine scanning is performed in the full detection-activated region containing the touch point, and the coarse scanning is also performed in the remaining region other than the full detection-activated region. As shown in FIG. 2C, in the first M frames from the M+N successive frames, each of drive lines Tx within the full detection-activated region ABCD is driven, and each of sense lines Ry within the full detection-activated region ABCD is detected. In a region other than the full detection-activated region ABCD, however, drive lines Tx being spaced apart from one another by one of the drive lines are still driven, and sense lines Ry being spaced apart from one another by one of the sense lines are still detected, as shown in FIG. 2A. As shown in FIG. 2D, in the succeeding N frames from the M+N successive frames, likewise, each of the drive lines Tx within the full detection-activated region ABCD is driven, and each of the sense lines Ry within the full detection-activated region ABCD is detected, but in the region other than the full detection-activated region ABCD, driving the drive lines and detecting the sense lines are stopped, which is the same as the scanning manner shown in FIG. 2B. Thus, throughout the whole M+N frames, scanning is continuously performed by each of the drive lines Tx within the full detection-activated region ABCD and each of the sense lines Ry within the full detection-activated region ABCD, but the remaining region other than the full detection-activated region ABCD is subjected to different scanning way for different time periods. Preferably, in the whole M+N successive frames, the scanning manner in the region other than the full detection-activated region can be the same as the scanning manner when the touch screen in absence of a touch, i.e., the coarse scanning, which is not discussed again herein.

Preferably, M is equal to 1, that is, during the coarse scanning, in the first frame from the 1+N successive frames, drive lines Tx being spaced apart from one another by at least one of the drive lines are driven, and sense lines Ry being spaced apart from one another by at least one of the sense lines are detected; while in the succeeding N frames from the 1+N successive frames, driving the drive lines and detecting the sense lines are stopped. Or preferably, N is equal to 1, that is, during the coarse scanning, in the first M frames from the M+1 successive frames, drive lines Tx being spaced apart from one another by at least one of the drive lines are driven, and sense lines Ry being spaced apart from one another by at least one of the sense lines are detected; while in the last one frame from the M+1 successive frames, driving the drive lines and detecting the sense lines are stopped. More preferably, both M and N are equal to 1, that is, in the first frame from the two successive frames, drive lines Tx being spaced apart from one another by at least one of the drive lines are driven, and sense lines Ry being spaced apart from one another by at least one of the sense lines are detected; while in the later frame from the two successive frames, driving the drive lines and detecting the sense lines are stopped. Alternatively, in the first frame from the two successive frames, driving the drive lines and detecting the sense lines are stopped; while in the later frame from the two successive frames, drive lines Tx being spaced apart from one another by at least one of the drive lines are driven, and sense lines Ry being spaced apart from one another by at least one of the sense lines are detected. These alternatives may be selectively applied depending on the specific conditions.

The extent of power saving in the touch screen depends on a number of frames in which driving the drive lines and detecting the sense lines are stopped during the coarse scanning If both M and N are equal to 1 and the coarse scanning on the drive lines or the sense lines is conducted every two drive lines or sense lines, the power saving can be up to 75% in absence of a touch, and can be over 50% in the presence of a touch, so that the power consumption can be saved greatly. In the case of a large-sized touch screen, the comparative driving capability is significantly higher than that in the prior art, while ensuring the accuracy of touch detection.

More preferably, the touch scanning method further includes: at the time when the present touch is released, maintaining the fine scanning on the full detection-activated region for a first time period, and subsequently performing the coarse scanning on the entire touch screen when the first time period is expired and the absence of the touch is determined. This is to prevent mal-operation generated in a sliding touch, thus achieving the seamless detection of a sliding touch while reducing power consumption. The embodiment supports a multi-touch operation, a sliding operation, and the like. Here, the first time period may be set as desired, for example, the first time period can be set to 10 ms, which is illustrative and not limiting. The full detection-activated region in which the fine scanning is maintained may be a full detection-activated region defined in last fine scanning

[Another Embodiment]

In the present embodiment, during the coarse scanning, in the first M frames of M+N successive frames, drive lines being spaced apart from one another by at least one of the drive lines are driven, and sense lines being spaced apart from one another by at least one of the sense lines are detected, while in the succeeding N frames of the M+N successive frames, driving the drive lines and detecting the sense lines are stopped.

Figure 3A:
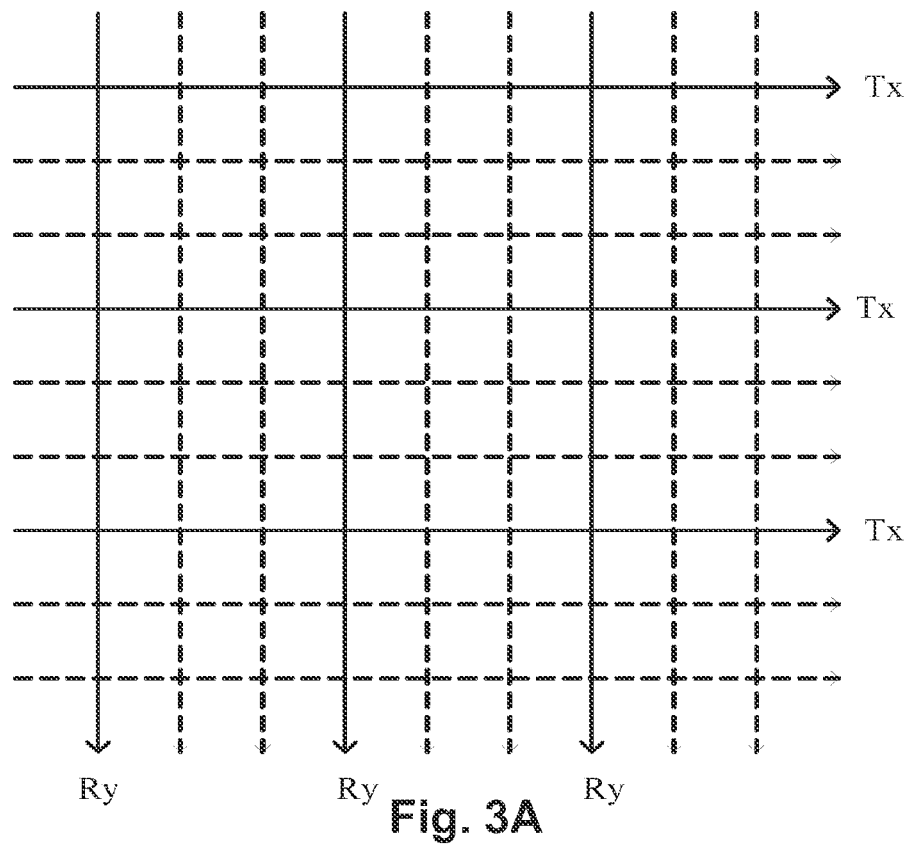
FIGS. 3A to 3E are simplified schematic diagrams of a scanning method according to an embodiment of the present invention.
Figure 3B:
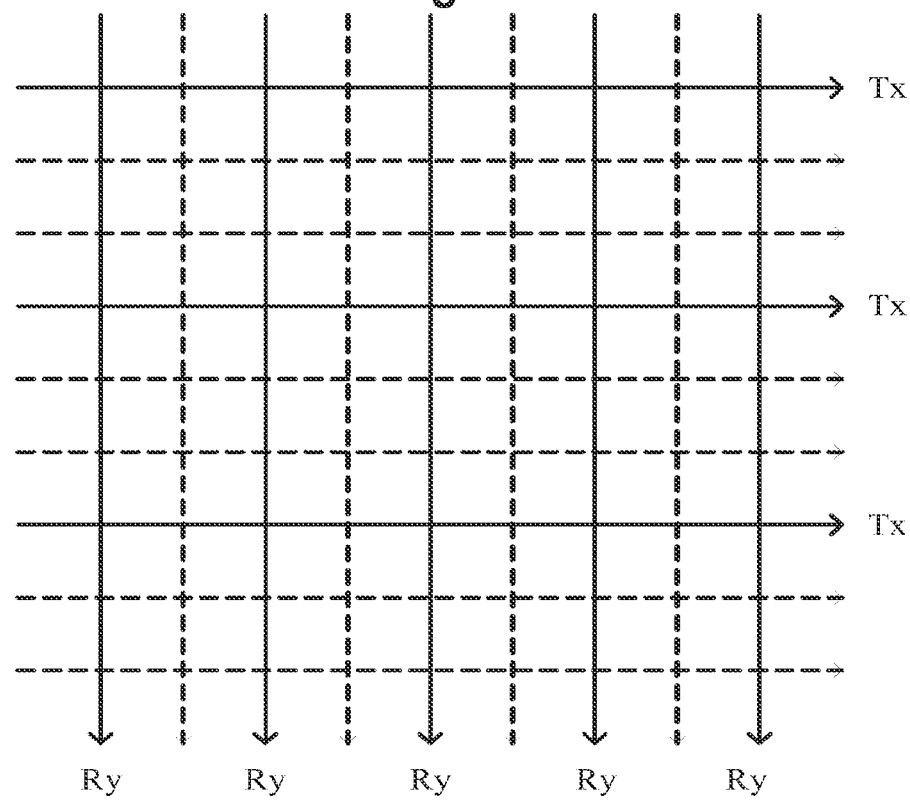

As shown in FIG. 3A, in the first M frames, drive lines being spaced apart from one another by two of the drive lines are driven, and sense lines being spaced apart from one another by two of the sense lines are detected, here, the interval of the driven drive lines (represented in terms of the number of drive lines) is the same as the interval of the detected sense lines (represented in terms of the number of sense lines), and both of the intervals are equal to 2 for example. Alternatively, as shown in FIG. 3B, drive lines being spaced apart from one another by two of the drive lines are driven, and sense lines being spaced apart from one another by one of the sense lines are detected, or alternatively, drive lines being spaced apart from one another by one of the drive lines are driven, and sense lines being spaced apart from one another by two of the sense lines are detected, that is, the interval of the driven drive lines is different from the interval of the detected sense lines. Of course, driving the drive lines and detecting the sense lines can be in any manner as long as drive lines being spaced apart from one another by at least one of the drive lines are driven, and sense lines being spaced apart from one another by at least one of the sense lines are detected (under the situation that there is one drive line per row, and there is one sense line per column), and the specific scanning manner is dependent on the specific requirements for the design of the touch electrodes as well as the specific scanning intention. Herein, the number of the specific intervals is not limited.

Figure 3C:
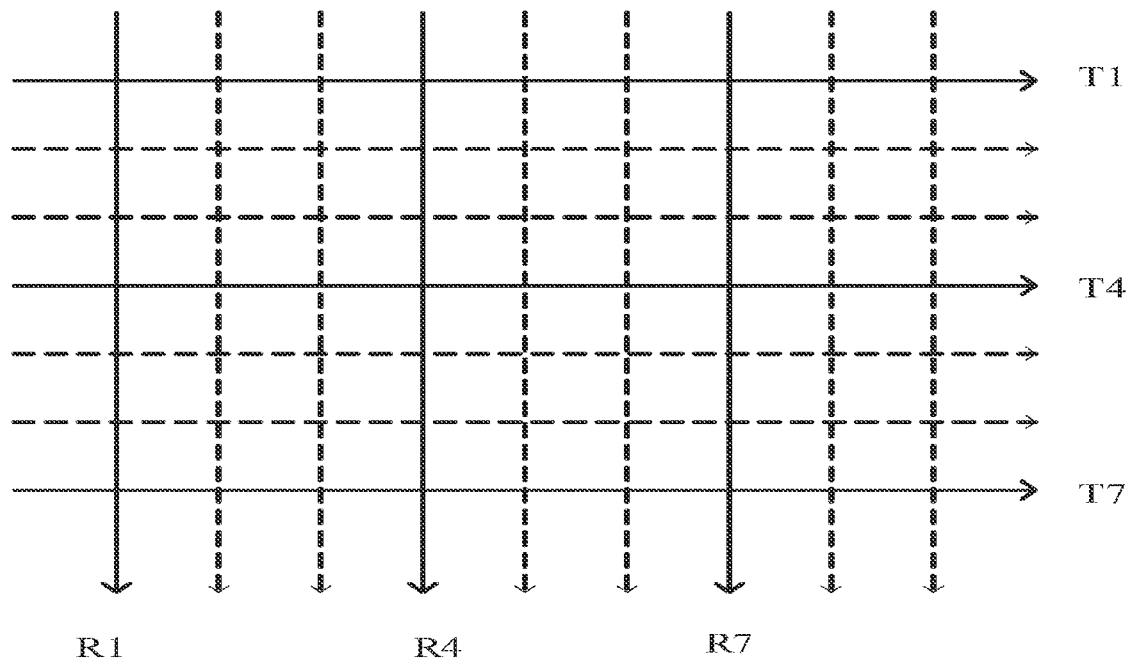
Figure 3D:
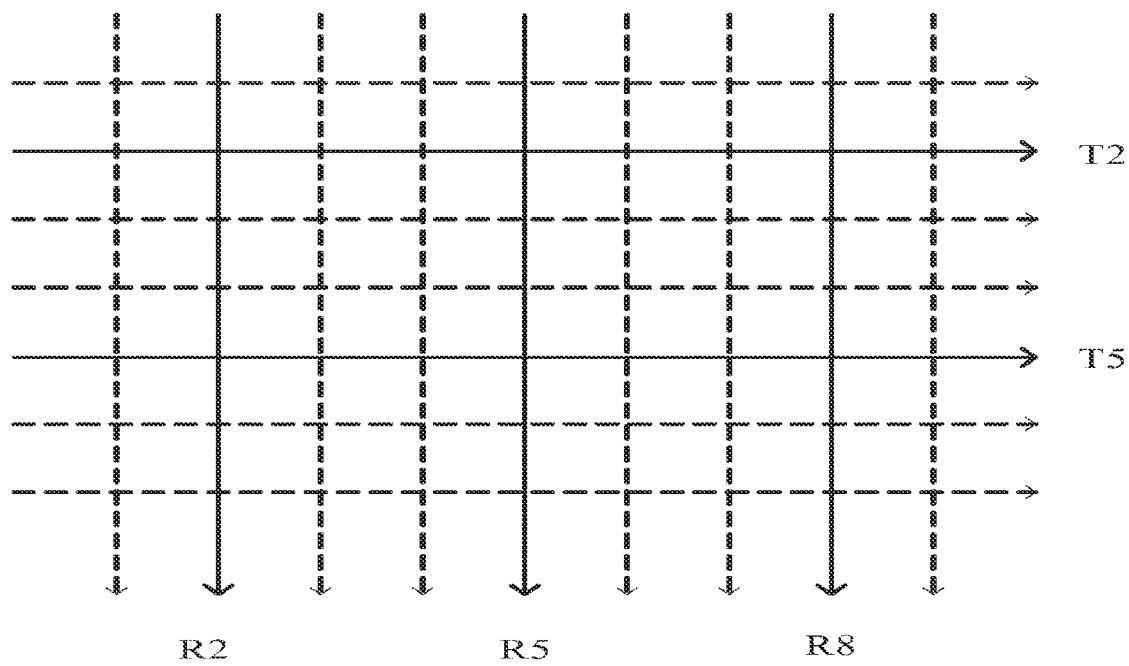
Figure 3E:
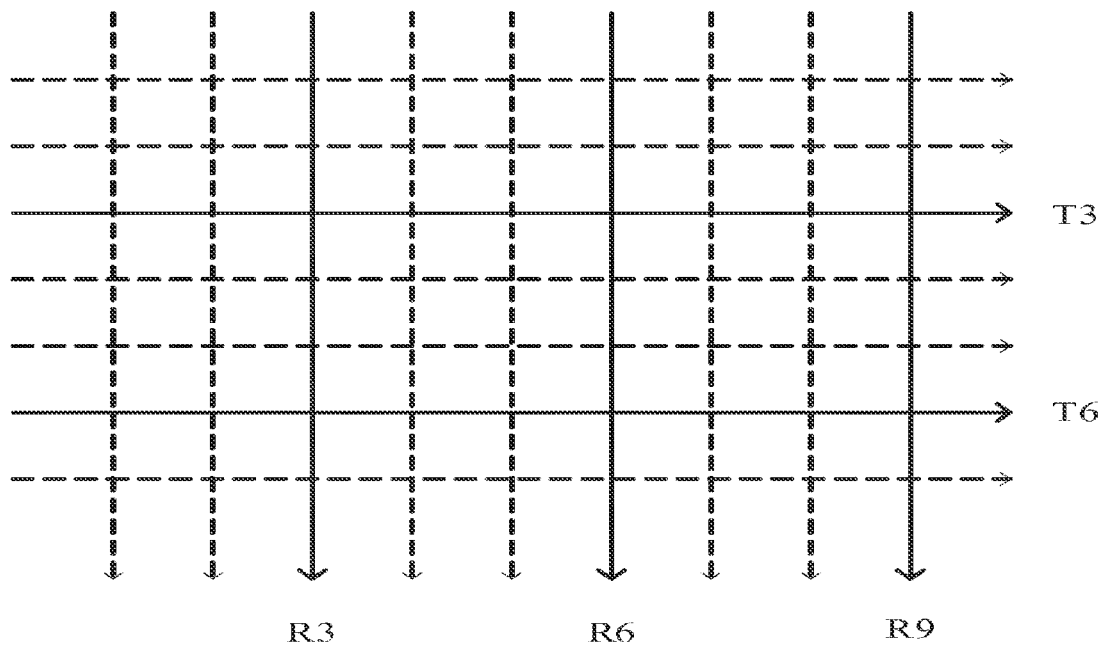

In another aspect, for the sake of explanation, both M and N are equal to 1, for example. As shown in FIG. 3C, during the coarse scanning, in the first frame from two successive frames, three drive lines T1, T4 and T7 are driven, and three sense lines R1, R4 and R7 are detected; while in the later frame from the two successive frames, driving the drive lines and detecting the sense lines are stopped. As shown in FIG. 3D, in the first frame from the next two successive frames, two drive lines T2 and T5 are driven, and three sense lines R2, R5 and R8 are detected; while in the later frame from said next two successive frames, driving the drive lines and detecting the sense lines are stopped. As shown in FIG. 3E, in the first frame from the third coming two successive frames, two drive lines T3 and T6 are driven, and three sense lines R3, R6 and R9 are detected; while in the later frame from the third coming two successive frames, driving the drive lines and detecting the sense lines are stopped. In the subsequent frames, the scanning manner as shown in FIGS. 3C to 3E is repeated. Therefore, in the first frames from various groups of two successive frames, the number of the drive lines actually driven and the number of the sense lines actually detected may be varied or maintained unchanged, and the drive line or sense line in the same position may be selected or the drive lines or sense lines in different positions may be selected, depending on the number of the drive lines or the sense lines provided in the entire touch screen; even in the same frame, the number of the drive lines subjected to the scanning may be different from or the same as the number of the sense lines subjected to the scanning Preferably, the drive line selected in the first frame from each group of two successive frames is one next to the drive line selected in the first frame from the preceding group of two successive frames, to comply with a recursive relationship. Likewise, preferably the sense lines are selected in the same recursive way as the drive lines. Here, it is possible that either the drive lines or the sense lines are selected in the recursive way, or both the drive lines and the sense lines are selected in the recursive way.

If M or N is not equal to 1, then in adjacent frames of the M frames, the drive lines or the sense lines for the scanning may be selected in the manner as described above, that is, the drive line or sense line in the same position may be selected for driving or detecting among the adjacent frames, or the drive lines or sense lines in different positions may be selected for driving or detecting among the adjacent frames.

With the touch scanning method provided by the present embodiment in which drive lines being spaced apart from one another by at least one of the drive lines are driven, and sense lines being spaced apart from one another by at least one of the sense lines are detected, the power consumed for the scanning on the touch screen can be saved over 75%, and the comparative driving capability is significantly higher than that in the prior art, while ensuring the accuracy of the touch detection. Furthermore, the present embodiment also supports a multi-touch operation, a sliding operation, and the like.

What needs to be noted is that the coarse scanning manner according to the present embodiment is not only suitable for the scanning on the entire touch screen in absence of a touch, but also for the scanning on the region other than the full detection-activated region in the presence of a touch.

[Another Embodiment]

Figure 4:
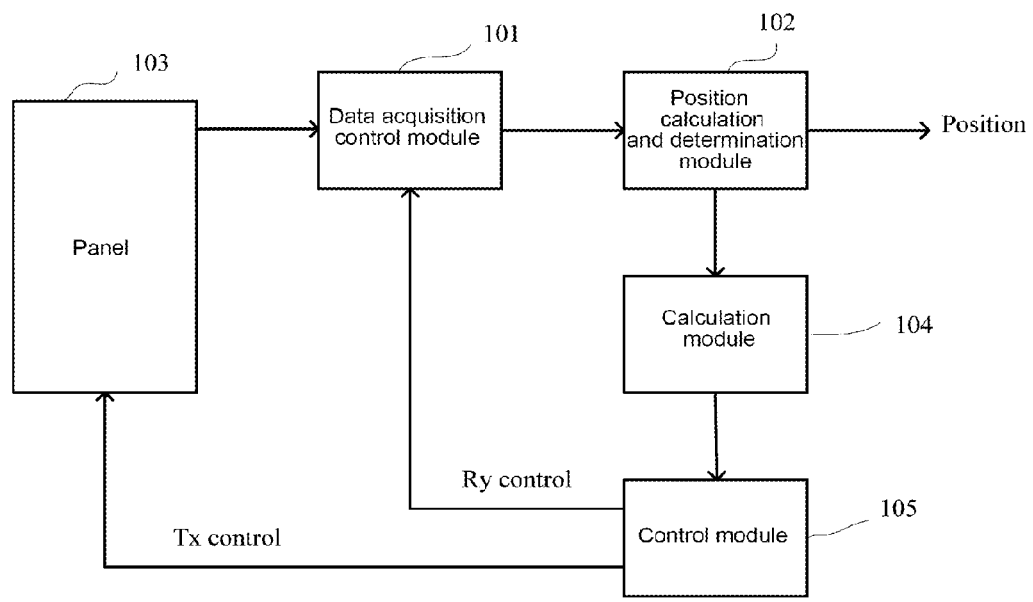
FIGS. 4 and 5 are simplified schematic diagrams showing operations of a control circuit according to an embodiment of the invention.

The present embodiment discloses a touch scanning control circuit applicable to a touch screen with the touch scanning methods provided in foregoing embodiments. As shown in FIG. 4, the touch scanning control circuit includes: a data acquisition control module 101, a position calculation and determination module 102, a calculation module 104, and a control module 105. The data acquisition control module 101 is configured to acquire data in the presence of a touch on the panel 103 and send the acquired data to the position calculation and determination module 102; the position calculation and determination module 102 is configured to calculate a touch position based on the acquired data, determine a center position nearest to the touch position, and send the center position to the calculation module 104; the calculation module 104 is configured to define a full detection-activated region; and the control module 105 is configured to perform a fine scanning on the full detection-activated region, and perform a coarse scanning on the remaining region other than the full detection-activated region. During the coarse scanning, in first M frames from M+N successive frames, drive lines being spaced apart from one another by at least one of the drive lines are driven, and sense lines being spaced apart from one another by at least one of the sense lines are detected; while in succeeding N frames of the M+N successive frames, driving the drive lines and detecting the sense lines are stopped. During the fine scanning, in the M+N successive frames, each of drive lines within the full detection-activated region is driven and each of sense lines within the full detection-activated region is detected. Both M and N are positive integers equal to or greater than 1.

Specifically, when a touch occurs, the sensing signal obtained from the panel 103 is changed, so that the touched position may be determined from the change of the sensing signal. The data acquisition control module 101 is configured to acquire data of the signal, and send the acquired data to the position calculation and determination module 102.

Figure 5:
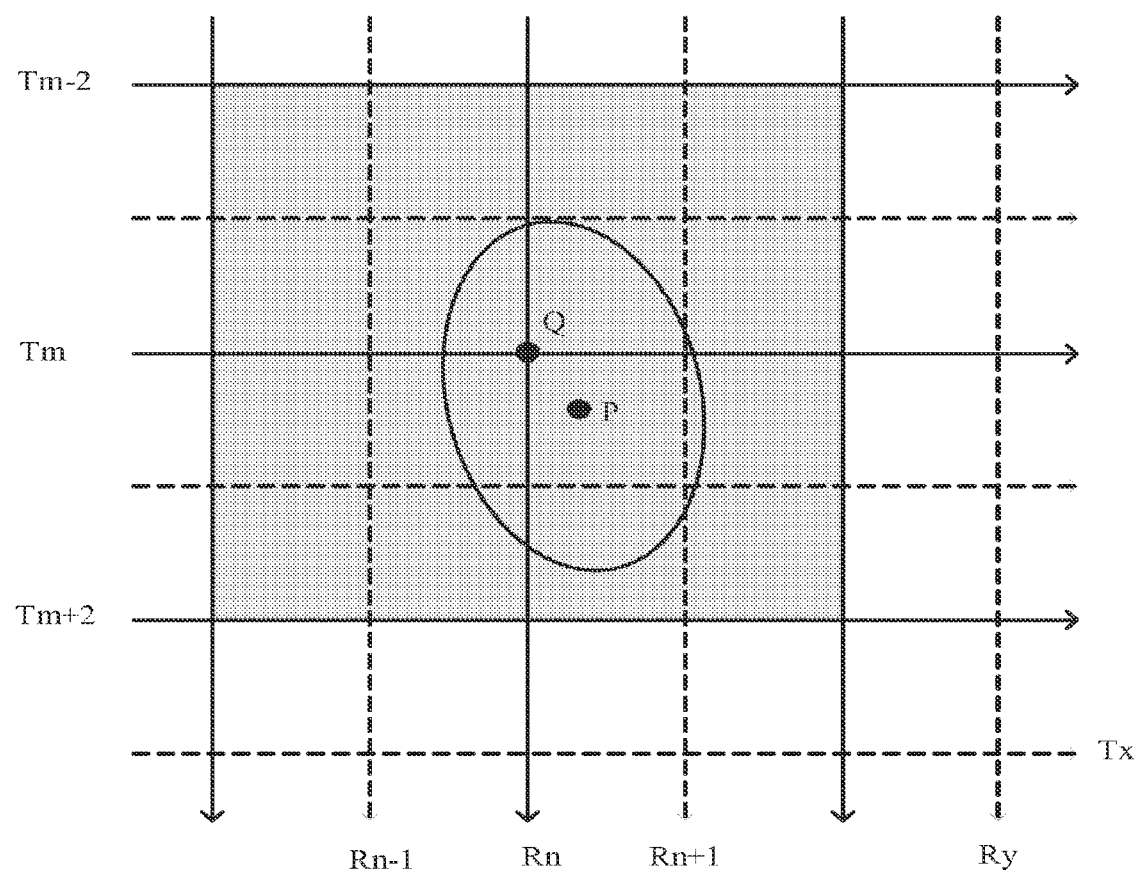

The position calculation and determination module 102 is configured to calculate the touch position based on the above acquired data, determine the center position nearest to the touch position, and send the center position to the calculation module 104. Preferably, the touch position may be identified in the form of a two-dimensional coordinates (x, y) in a coordinate system, where x denotes the coordinate value in the X-axis and y denotes the coordinate value in the Y-axis; alternatively, the touch position may be defined by a binary code composed of a series of digits 0 and 1, and then the touch position may be identified in the system by using corresponding algorithms; alternatively, the touch position may be identified by using other specialized codes or algorithms. The determination of the touch position in the system is not limited here. In the present embodiment, the touch position is determined by the coordinates for illustration, for example. As shown in FIG. 5, when the touch position P(Tx, Ry) is calculated according to the acquired data, a center position Q(Tm, Rn) nearest to the touch position P is determined and sent to the calculation module 104. Herein, the center position refers to an intersection which is among the intersections formed by the drive lines Tx and the sense lines Ry and is nearest to the touch position The calculation module 104 is configured to define a full detection-activated region according to a certain rule based on the obtained center position Q. The rule may vary according to specific needs, and rules for different objects may define different full detection-activated regions. The rule can be an algorithm, such as a program compiled by software, or can be a certain control result achieved by hardware. The following description is made by an example where the touch position is determined by the coordinates, for example. Preferably, in the present embodiment, the calculation module 104 is configured to define, by taking the center position Q(Tm, Rn) sent by the position calculation and determination module 102 as a reference, an area surrounded by the i-th drive line ahead of the center position Q, the j-th drive line behind the center position Q, the k-th sense line on the left of the center position Q, and the l-th sense line on the right of the center position Q as the full detection-activated region, where i, j, k, l all are positive integers no less than 0, and may have the same value or may have values different from each other, or some of i, j, k, l may have the same value. Preferably, i and j should not be set to be 0 simultaneously, and k and l should not be set to be 0 simultaneously. In FIG. 5, each of i, j, k, l is set to be 2, that is, the full detection-activated region is defined by the calculation module 104 as an area surrounded by the drive lines $T_{m-2}$ and $T_{m+2}$ as well as the sense lines $R_{n-2}$ and $R_{n+2}$. It should be noted that the above illustration is made merely in the case of only one touch point. If multiple points are touched simultaneously, the center positions Q indicate several different points, and respective area corresponding to each of the center positions Q can be calculated as described above, together forming the full detection-activated region.

The control module 105 is configured to perform the fine scanning on the full detection-activated region, and perform the coarse scanning on the remaining region other than the full detection-activated region. The definitions, presentations, and working modes of the coarse scanning and the fine scanning, or other related contents, have been specifically set forth in the foregoing embodiments, which can be referred to in this embodiment and will not be described again herein.

In the present embodiment, preferably, M or N is equal to 1, that is, during the coarse scanning performed by the touch scanning control circuit, in the first frame from the 1+N successive frames, drive lines being spaced apart from one another by at least one of the drive lines are driven, and sense lines being spaced apart from one another by at least one of the sense lines are detected; while in the succeeding N frames from the 1+N successive frames, driving the drive lines and detecting the sense lines are stopped; or in the first M frames from the M+1 successive frames, drive lines being spaced apart from one another by at least one of the drive lines are driven, and sense lines being spaced apart from one another by at least one of the sense lines are detected; while in the last frame from the M+1 successive frames, driving the drive lines and detecting the sense lines are stopped. More preferably, both M and N are equal to 1, that is, in the first frame from the two successive frames, drive lines being spaced apart from one another by at least one of the drive lines are driven, and sense lines being spaced apart from one another by at least one of the sense lines are detected; while in the later frame from the two successive frames, driving the drive lines and detecting the sense lines are stopped.

Preferably, in the coarse scanning performed by the control module 105, drive lines being spaced apart from one another by one of the drive lines are driven, and sense lines being spaced apart from one another by one of the sense lines are detected. The coarse scanning is not only performed on the entire touch screen in absence of a touch, but also performed in the remaining region other than the full detection-activated region in the presence of a touch. For other modes operated by use of the touch scanning control circuit according to the present embodiment, references may be made to the foregoing embodiments and a specific description will not be given again herein.

With the touch scanning control circuit according to the present embodiment, the power consumed for scanning the touch screen can be saved up to 75% in absence of a touch, even over 75% if the interval of the driven drive lines or the detected sense lines includes more than 1 drive lines or sense lines, and the power consumed for scanning the touch screen can also be saved by no less than 50% in the presence of a touch. Therefore, in the case of a large-sized touch screen detection, the driving ability is significantly higher than that in the prior art, while ensuring the accuracy of the touch detection. In addition, the touch scanning control circuit in the present embodiment supports a multi-touch operation, and a sliding operation, etc.

An embodiment of the invention also provides a display device, and the display device includes a display module as well as a touch screen and a touch scanning control circuit according to any one of the above embodiments, where the touch scanning control circuit is in electrical connection with the touch screen. The touch scanning control circuit, which has been specifically set forth in detail in the above embodiments, is not discussed again herein. The way of the electrical connection may be, but not limited to, a wire, a circuit, or a flexible printed circuit board (FPC), or any other way of electrical connections available to those skilled in the art, which will not be completely enumerated herein. Furthermore, various types of the touch screens may be included, and the touch screen may be integrated with the display module of the display device in any way, which is not particularly limited. For example, the touch screen may be additionally attached to the external of the display module (outside type), or embedded in the display module (in-cell type), or formed directly manufactured on an outside of the glass of the display module (on-cell type).

In summary, the embodiments of the present invention provide a touch scanning method for a touch screen and a corresponding touch scanning control circuit and a display device, so that, in the case of the detection for a large-sized touch screen, the comparative driving capability of the IC(integrated circuit) is significantly higher than that in the prior art, the accuracy of the touch detection is ensured, and further the power is greatly saved.

It should be noted that the above embodiments can be referred to each other and combined. The preferred embodiments of the present invention have been described as above, but are not intended to limit the present invention. Any modifications and variations can be made to the technical solutions of the invention by those skilled in the art in light of the above disclosed methods and techniques without departing from the essence and the scope of the present invention. Accordingly, any modifications, equivalent variations, decorations, etc., that are essentially made to the above embodiments based on the techniques of the invention, if not departing from the contents or essence of the technical solutions of the present invention, should fall into the scope of the following claims.

What is claimed is:

1. A method for scanning a touch screen comprising a plurality of drive lines and a plurality of sense lines arranged in a matrix, the method comprising: if a touch is not determined to be present, performing a coarse scanning on the touch screen, if a touch is determined to be present, performing a fine scanning on a full detection-activated region containing a touch point while performing a coarse scanning on a remaining region of the touch screen other than the full detection-activated region, the full detection-activated region being defined based on the touch point to be a subset of the plurality of drive lines and the plurality of sense lines of the touch screen; and at the time when a determined present touch is released following the fine scanning on the full detection-activated region, maintaining the fine scanning on the full detection-activated region for a first time period, and subsequently performing the coarse scanning on the entire touch screen if a touch is not determined to be present when the first time period is expired;

wherein, the coarse scanning comprises, in first M frames of M+N successive frames:

driving a set of drive lines of the plurality of drive lines being spaced apart from one another by at least one of the plurality of drive lines, and detecting a set of sense lines of the plurality of sense lines being spaced apart from one another by at least one of the plurality of sense lines; and in succeeding N frames of the M+N successive frames, stopping driving all of the plurality of drive lines on the entire touch screen and stopping detecting all of the plurality of sense lines on the entire touch screen;

wherein M and N are integers equal to or greater than 1;

wherein the fine scanning comprises, in M+N successive frames:

driving each of drive lines within the full detection-activated region; and detecting each of sense lines within the full detection-activated region;

wherein the coarse scanning is repeatedly performed if a touch is not determined to be present.

2. The method of claim 1, wherein M and N are equal to 1.

3. The method of claim 1, wherein, in the coarse scanning, the driven drive lines are spaced apart from one another by one of the drive lines, and the detected sense lines are spaced apart from one another by one of the sense lines.

4. A touch scanning control circuit in electrical connection with a touch screen having a plurality of drive lines and a plurality of sense lines, the touch scanning control circuit comprises:

a data acquisition control module;

a position calculation and determination module;

a calculation module; and a control module, wherein the data acquisition control module is configured to acquire data in response to a determined presence of a touch and send the acquired data to the position calculation and determination module, wherein the position calculation and determination module is configured to calculate a touch position based on the acquired data, determine a center position nearest to the touch position, and send the center position to the calculation module, wherein the calculation module is configured to define a full detection-activated region, the full detection-activated region being defined based on the touch position to be a subset of the plurality of drive lines and the plurality of sense lines of the touch screen, wherein the control module is configured, if a touch is not determined to be present, to perform a coarse scanning on the touch screen, and the control module is configured, if a touch is determined to be present, to perform a fine scanning on the full detection-activated region containing the touch position while performing a coarse scanning on a remaining region other than the full detection-activated region; and, at the time when a determined present touch is released following the fine scanning on the full detection-activated region, maintain the fine scanning on the full detection-activated region for a first time period, and subsequently perform the coarse scanning on the entire touch screen if a touch is not determined to be present when the first time period is expired;

wherein, in the coarse scanning, in first M frames of M+N successive frames, a set of drive lines of the plurality of drive lines spaced apart from one another by at least one of the plurality of drive lines are driven, and a set of sense lines of the plurality of sense lines spaced apart from one another by at least one of the plurality of sense lines are detected, wherein, in succeeding N frames of the M+N successive frames, all of the plurality of drive lines are stopped from being driven on the entire touch screen and all of the plurality of sense lines are stopped from being detected on the entire touch screen; M and N being integers equal to or greater than 1; and wherein, in the fine scanning, in the M+N successive frames, each of drive lines within the full detection-activated region is driven, and each of sense lines within the full detection-activated region is detected;

wherein the coarse scanning is repeatedly performed if a touch is not determined to be present.

5. The touch scanning control circuit of claim 4, wherein M is equal to 1.

6. The touch scanning control circuit of claim 5, wherein N is equal to 1.

7. The touch scanning control circuit of claim 4, wherein, in the coarse scanning controlled by the control module, the drive lines spaced apart from one another by one of the drive lines are driven, and the sense lines spaced apart from one another by one of the sense lines are detected.

8. The touch scanning control circuit of claim 4, wherein the calculation module defines, by taking the center position sent by the position calculation and determination module as a reference, an area surrounded by an i-th drive line ahead of the center position, a j-th drive line behind the center position, a k-th sense line on the left of the center position, and an l-th sense line on the right of the center position as the full detection-activated region, wherein i, j, k, l all are integers equal to or greater than 0.

9. A display device comprises:
a touch screen having a plurality of drive lines and a plurality of sense lines; and
a touch scanning control circuit in electrical connection with the touch screen, the touch scanning control circuit comprising a data acquisition control module, a position calculation and determination module, a calculation module, and a control module,
wherein the data acquisition control module is configured to acquire data in response to a determined presence of a touch and send the acquired data to the position calculation and determination module;
wherein the position calculation and determination module is configured to calculate a touch position based on the acquired data, determine a center position nearest to the touch position, and send the center position to the calculation module;
wherein the calculation module is configured to define a full detection-activated region, the full detection-activated region being defined based on the touch position to be a subset of the plurality of drive lines and the plurality of sense lines of the touch screen;

wherein the control module is configured, if a touch is not determined to be present, to perform a coarse scanning on the touch screen, and the control module is configured, if a touch is determined to be present, to perform a fine scanning on the full detection-activated region containing the touch position while performing a coarse scanning on a remaining region other than the full detection-activated region; and, at the time when a determined present touch is released following the fine scanning on the full detection-activated region, maintain the fine scanning on the full detection-activated region for a first time period, and subsequently perform the coarse scanning on the entire touch screen if a touch is not determined to be present when the first time period is expired;

wherein, in the coarse scanning, in first M frames of M+N successive frames, drive a set of drive lines of the plurality of drive lines spaced apart from one another by at least one of the plurality of drive lines, and detect a set of sense lines of the plurality of sense lines spaced apart from one another by at least one of the plurality of sense lines, wherein, in succeeding N frames of the M+N successive frames, all of the plurality of drive lines are stopped from being driven on the entire touch screen and all of the plurality of sense lines are stopped from being detected on the entire touch screen; both M and N being integers equal to or greater than 1; and wherein, in the fine scanning, in the M+N successive frames, each of drive lines within the full detection-activated region is driven and each of sense lines within the full detection-activated region is detected;

wherein the coarse scanning is repeatedly performed if a touch is not determined to be present.

10. The display device of claim 9, wherein M is equal to 1.

11. The display device of claim 10, wherein N is equal to 1.

12. The display device of claim 9, wherein, in the coarse scanning controlled by the control module, the drive lines spaced apart from one another by one of the drive lines are driven, and the sense lines spaced apart from one another by one of the sense lines are detected.

13. The display device of claim 9, wherein the calculation module defines, by taking the center position sent by the position calculation and determination module as a reference, an area surrounded by an i-th drive line ahead of the center position, a j-th drive line behind the center position, a k-th sense line on the left of the center position, and an l-th sense line on the right of the center position as the full detection-activated region, wherein i, j, k, l are integers equal to or greater than 0.

* * * * *